United States Patent
Otoguro et al.

(10) Patent No.: US 10,994,788 B2
(45) Date of Patent: May 4, 2021

(54) VEHICLE BOTTOM STRUCTURE

(71) Applicant: Toyota Jidosha Kabushiki Kaisha, Toyota (JP)

(72) Inventors: Kazuma Otoguro, Toyota (JP); Ryoji Doi, Nagakute (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 16/542,802

(22) Filed: Aug. 16, 2019

(65) Prior Publication Data

US 2020/0062318 A1  Feb. 27, 2020

(30) Foreign Application Priority Data

Aug. 27, 2018 (JP) .............................. JP2018-158015

(51) Int. Cl.
*B62D 25/20* (2006.01)
*B60K 1/04* (2019.01)

(52) U.S. Cl.
CPC .............. *B62D 25/20* (2013.01); *B60K 1/04* (2013.01); *B60K 2001/0438* (2013.01)

(58) Field of Classification Search
CPC ... B62D 25/20; B60K 1/04; B60K 2001/0438
USPC ....................................................... 180/68.5
See application file for complete search history.

(56) References Cited

U.S. PATENT DOCUMENTS

| | | | | |
|---|---|---|---|---|
| 4,365,681 A | * | 12/1982 | Singh | B60K 1/04 180/68.5 |
| 5,501,289 A | * | 3/1996 | Nishikawa | B62D 21/12 180/68.5 |
| 7,614,473 B2 | * | 11/2009 | Ono | B60L 58/21 180/299 |
| 9,227,582 B2 | * | 1/2016 | Katayama | B60L 1/003 |
| 9,688,314 B2 | * | 6/2017 | Ajisaka | B60K 15/073 |
| 2004/0104602 A1 | * | 6/2004 | Cardimen | B62D 21/157 296/204 |
| 2005/0211496 A1 | * | 9/2005 | Ito | B60K 15/063 180/314 |
| 2012/0161429 A1 | * | 6/2012 | Rawlinson | B60L 58/21 280/801.1 |

(Continued)

FOREIGN PATENT DOCUMENTS

CN  201347134 Y  * 11/2009
CN  201347134 Y  11/2009

(Continued)

OTHER PUBLICATIONS

Translation of CN201347134Y accessed at www.espacenet.com on Sep. 14, 2020. (Year: 2009).*

(Continued)

*Primary Examiner* — James A Shriver, II
*Assistant Examiner* — Hilary L Johns
(74) *Attorney, Agent, or Firm* — Dinsmore & Shohl LLP

(57) ABSTRACT

A vehicle bottom structure includes: side members; a plurality of cross members that extend in the width direction of the vehicle, are joined to the side members at both end parts, and support the bottom of a battery pack disposed under a floor panel between the side members, from below; and front-rear direction reinforcing members that extend in the front-rear direction of the vehicle and are joined on the cross members so as to cross the cross members.

8 Claims, 5 Drawing Sheets

(56) References Cited

U.S. PATENT DOCUMENTS

| | | | |
|---|---|---|---|
| 2013/0175829 A1* | 7/2013 | Kim | B60L 50/66 296/204 |
| 2013/0229030 A1* | 9/2013 | Yamaguchi | B60L 50/66 296/193.07 |
| 2014/0014428 A1* | 1/2014 | Yanagi | B60K 1/04 180/68.5 |
| 2014/0117716 A1* | 5/2014 | Patberg | B62D 1/04 296/187.08 |
| 2014/0262573 A1* | 9/2014 | Ito | H01M 10/613 180/68.5 |
| 2017/0217296 A1* | 8/2017 | Nomura | B60R 19/02 |
| 2018/0126835 A1* | 5/2018 | Saeki | B62D 21/02 |
| 2018/0290531 A1* | 10/2018 | Ajisaka | B60K 1/04 |

FOREIGN PATENT DOCUMENTS

| | | | | |
|---|---|---|---|---|
| DE | 102012203892 A1 * | 9/2013 | | B60K 1/04 |
| DE | 102012203892 A1 | 9/2013 | | |
| EP | 3557653 A1 | 10/2019 | | |
| JP | 2014012524 A * | 1/2014 | | |
| JP | 2014-019203 A | 2/2014 | | |

OTHER PUBLICATIONS

Translation of JP2014012524A accessed on Sep. 18, 2020 at www.espacenet.com (Year: 2014).*

* cited by examiner

CROSS-SECTION ALONG LINE B-B

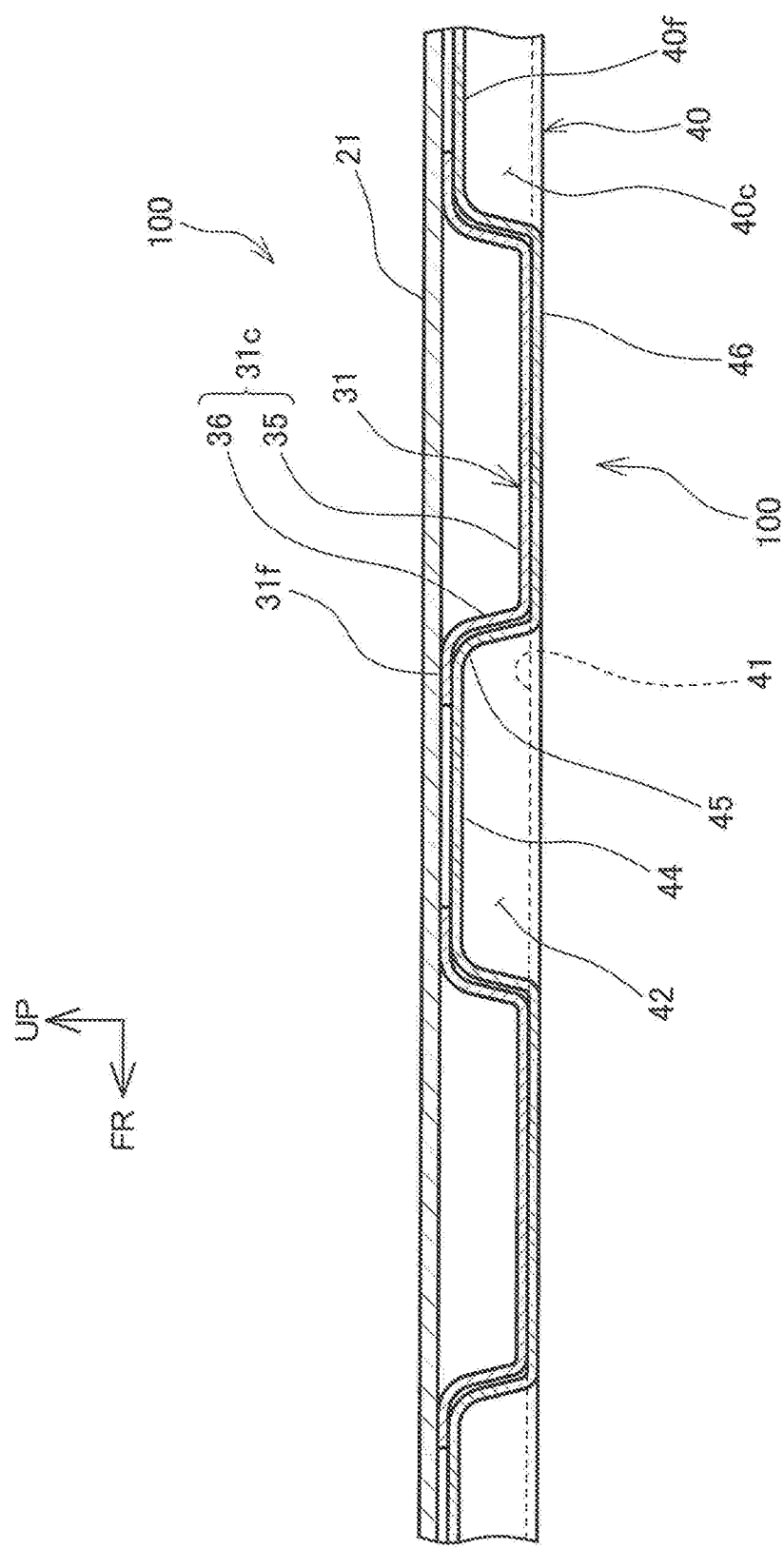
FIG.5 CROSS-SECTION ALONG LINE C-C

VEHICLE BOTTOM STRUCTURE

CROSS REFERENCE TO RELATED APPLICATION

This application claims priority to Japanese Patent Application No. 2018-158015 filed on Aug. 27, 2018, which is incorporated herein by reference in its entirety including the specification, claims, drawings, and abstract.

TECHNICAL FIELD

The present disclosure relates to a vehicle bottom structure for mounting a battery pack under a floor panel.

BACKGROUND

Nowadays, many electric vehicles have battery packs under their floor. JP 2014-19203 A discloses a battery pack structure which includes a casing for storing batteries that has cross members disposed inside so as to extend in the vehicle width direction, and brackets protruding in the vehicle width direction from the positions on the outer surfaces where the cross members are disposed, and is fixed under the floor of a vehicle by joining the brackets to the bottom of the vehicle body.

SUMMARY

Incidentally, for electric vehicles, there is a requirement to suppress damage of battery packs during collision. Further, in the case where a battery pack is mounted under a floor, the battery pack might be damaged due to interfere with the road. For this reason, there is also a requirement to suppress damage of battery packs during interference with the road. In the related technology disclosed in JP 2014-19203 A, since the cross members are fixed in the vehicle width direction, the rigidity in the vehicle width direction is high. Therefore, when the vehicle is hit on the side, deformation of the battery pack can be reduced and damage can be suppressed.

However, since the rigidity in the front-rear direction of the vehicle is low, in the case where the front part of the vehicle collides with an obstacle, the battery pack might be deformed and damaged by the impact from the front of the vehicle. Also, in the case where the vehicle interferes with the road while running, if an impact from the front of the vehicle is input to the battery pack, the battery pack might be deformed and damaged.

An object of the present disclosure is to suppress damage of a battery pack mounted under a floor.

The present disclosure is directed to a vehicle bottom structure including: a pair of side members that are disposed on both sides of a vehicle in a width direction and extend in a front-rear direction of the vehicle; a plurality of cross members that extend in the width direction of the vehicle, are joined to the side members at both end parts, and support a bottom of a battery pack disposed under a floor panel between the side members, from below; and a front-rear direction reinforcing member that is joined on the cross members so as to extend in the front-rear direction of the vehicle and cross the cross members.

As described above, the front-rear direction reinforcing member are joined on the plurality of cross members for supporting the battery pack from below, so as to cross the cross members. Therefore, an impact force in the front-rear direction of the vehicle which is input from the front of the vehicle to the cross members via the side members is distributed to the front-rear direction reinforcing members. Therefore, it is possible to suppress deformation and damage of the battery pack. Also, in the case where a pole collides with one side between the cross members, it is possible to suppress opening of the cross members in the front-rear direction of the vehicle. Therefore, it is possible to suppress deformation and damage of the battery pack.

In the vehicle bottom structure of the present disclosure, the cross member and the front-rear direction reinforcing member may each be a long member having a hat-shaped cross-section and including: a groove-shaped part including a bottom plate and upright plates formed on both ends of the bottom plate in the width direction; and a flange connected to an open end of the groove-shaped part, and the front-rear direction reinforcing member may have cutouts that are formed at positions of the upright plates to intersect with the cross member and formed in U-shapes along a convex shape of the groove-shaped part of the cross member, and the bottom plate of the groove-shaped part of the front-rear direction reinforcing member may be disposed on and joined to the bottom plate of the groove-shaped part of the cross member.

As described above, since the bottom plates of the groove-shaped parts of the front-rear direction reinforcing members are disposed on the bottom plates of the groove-shaped parts of the cross members, and are joined thereto, the joint strength of the front-rear direction reinforcing members and the cross members is high. Therefore, even in the case where an impact force in the front-rear direction of the vehicle which is input from the front of the vehicle to the cross members via the side members is large, the impact force is distributed to the front-rear direction reinforcing members. Therefore, it is possible to suppress deformation and damage of the battery pack.

In the vehicle bottom structure of the present disclosure, the flange of the front-rear direction reinforcing member may extend in the front-rear direction of the vehicle and be disposed on and joined to the flange of the cross member between the upright plates of neighboring cross members facing each other, and a part of the front-rear direction reinforcing member to intersect with the cross member may be curved in a U-shape along the convex shape of the groove-shaped part of the cross member and disposed on the upright plates and the bottom plate of the groove-shaped part of the cross member.

According to this configuration, the groove-shaped parts of the cross members are held in the front-rear direction of the vehicle and the vertical direction of the vehicle by the parts of the flanges of the front-rear direction reinforcing members curved in the U-shapes. Therefore, in the case where a pole collides with a part of the vehicle between the cross members from one side, it is possible to more effectively suppress opening of the cross members in the front-rear direction of the vehicle. Therefore, it is possible to suppress deformation and damage of the battery pack. Also, the bottom plates of the groove-shaped parts of the front-rear direction reinforcing members and the bottom plates of the groove-shaped parts of the cross members are joined, and the flanges of the front-rear direction reinforcing members are disposed on the flanges of the cross members, and are joined thereto, and the groove-shaped parts of the cross members are held in the front-rear and vertical directions of the vehicle by the U-shape curved parts of the flanges of the front-rear direction reinforcing members. Therefore, the cross members and the front-rear direction reinforcing members constitute one planar structure, and can effectively distribute an input from the front-rear direction of the vehicle or the width direction of the vehicle. Therefore, it is possible to suppress deformation and damage of the battery pack during a collision or interference with the road.

In the vehicle bottom structure of the present disclosure, the cross member may include low-rigidity parts that are disposed on both sides in the width direction of the vehicle and have rigidity lower than the rigidity of a center part, and the front-rear direction reinforcing member may be disposed so as to cross the cross member at a position that is adjacent to the low-rigidity part and closer to a center in the width direction of the vehicle than the low-rigidity part.

In this case, during a collision from one side, the low-rigidity parts of the cross members absorb the energy of the collision, thereby reducing the impact, and the high-rigidity center parts of the cross members and the front-rear direction reinforcing members hold the battery pack. Therefore, during a collision from one side, it is possible to suppress deformation and damage of the battery pack.

In the vehicle bottom structure of the present disclosure, the low-rigidity parts of the cross member may be located further outward in the width direction of the vehicle than outer surfaces of the battery pack in the width direction of the vehicle, and the front-rear direction reinforcing member may be located further inward in the width direction of the vehicle than the outer surfaces of the battery pack in the width direction of the vehicle.

In this case, during a collision from one side, the areas between the side members and the battery packs can absorb the impact. Therefore, it is possible to suppress deformation and damage of the battery packs.

The present disclosure can suppress damage of the battery pack mounted under the floor.

BRIEF DESCRIPTION OF DRAWINGS

Embodiment(s) of the present disclosure will be described by reference to the following figures, wherein:

FIG. 5 is a cross-sectional view taken along a line C-C shown in FIG. 2 (a view illustrating a vertical cross-section of the cross members and the front-rear direction reinforcing member at a flange of the front-rear direction reinforcing member, taken along the longitudinal direction).

DESCRIPTION OF EMBODIMENTS

<Configuration of Vehicle Bottom Structure>

Hereinafter, a vehicle bottom structure 100 of an embodiment will be described with reference to the drawings. In the following description, an arrow FR, an arrow UP, and an arrow RH shown throughout the drawings indicate the front side (forward direction), upper side, and right side of a vehicle, respectively. Further, the directions opposite to the arrows FR, UP, and RH indicate the rear side, the lower side, and the left side, respectively. Hereinafter, when the front side, the rear side, the left side, the right side, the upper side, and the lower side are simply referred to, they indicate the front side and rear side of the vehicle in the front-rear direction, the left side and right side of the vehicle in the left-right direction (the width direction of the vehicle), and the upper side and lower side in the vertical direction of the vehicle.

Figure 1:
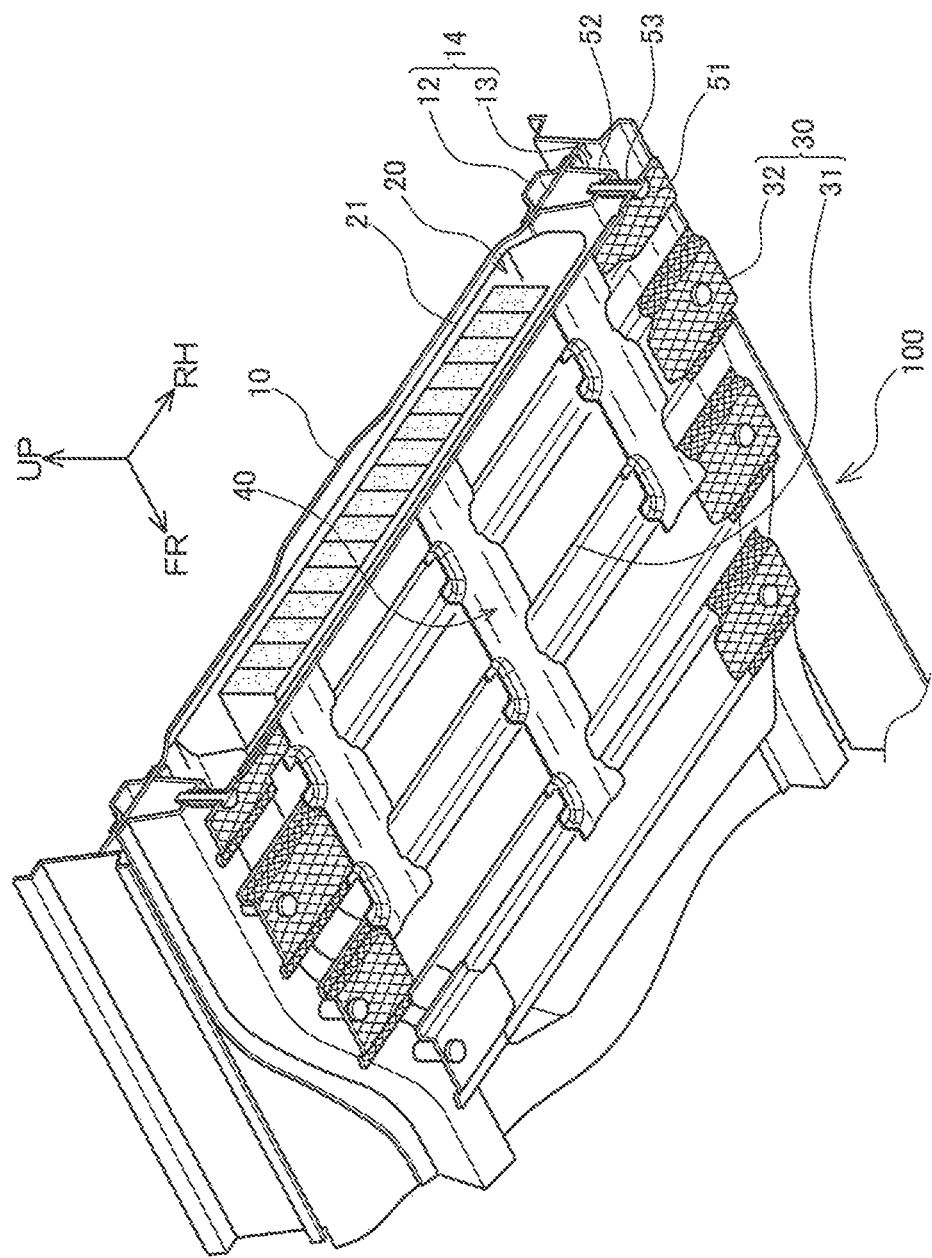
FIG. 1 is a perspective view illustrating a vehicle bottom structure of an embodiment as seen from below the vehicle.

As shown in FIG. 1, the vehicle bottom structure 100 is for mounting a battery pack 20 under a floor panel 10. The vehicle bottom structure 100 includes a pair of side members 14, a plurality of cross members 30, and a plurality of front-rear direction reinforcing members 40.

The floor panel 10 is a plate member to be a floor inside a vehicle. The side members 14 are frame members which are disposed on both sides of the floor panel 10 in the width direction of the vehicle, so as to extend in the front-rear direction of the vehicle. Each side member 14 is formed so as to have a closed cross-section structure by joining the open ends of an upper side-member part 12 and a lower side-member part 13 having hat-shaped cross-sections with the floor panel 10 interposed therebetween.

In the bottom walls of the lower side-member parts 13, through-holes are formed in the vertical direction, and on the top surfaces of the bottom walls, nuts 52 are welded so as to be coaxial with the holes. At positions of each side member 14 in the front-rear direction of the vehicle corresponding to positions where the cross members 30 are disposed, a plurality of holes and a plurality of nuts 52 are provided.

Each cross member 30 is a long member which has a hat-shaped cross-section and extends in the width direction of the vehicle, and both end parts are joined to the lower side-member parts 13 of the side members 14, respectively. The cross members 30 support the bottom of a casing 21 for the battery pack 20 disposed under the floor panel 10 between the side members 14, from below.

Figure 2:
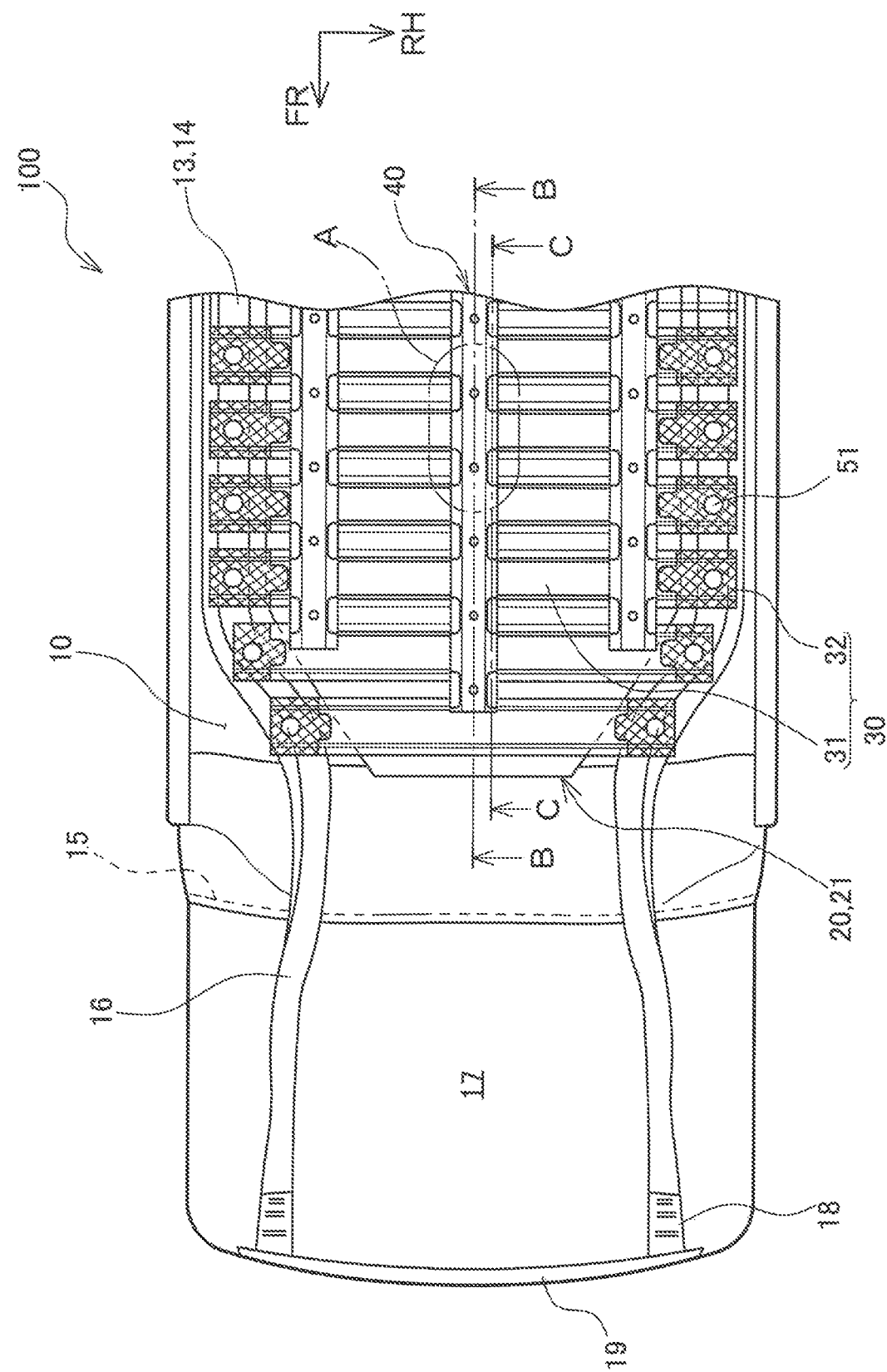
FIG. 2 is a plan view illustrating the vehicle bottom structure of the embodiment as seen from below the vehicle.

The cross members 30 include center parts 31 which have high rigidity, and low-rigidity parts 32 which are disposed on both end sides in the width direction of the vehicle, and have rigidity lower than the rigidity of the center parts 31. In FIG. 1 and FIG. 2, the low-rigidity parts 32 are parts shown by cross-hatching. In the present embodiment, the low-rigidity parts 32 are formed as members separate from the center parts 31, and are joined to the center parts 31 by welding. Therefore, the rigidity can be easily adjusted by changing the material or changing the thickness. It is also possible to form low-rigidity parts 32 by changing the cross-sectional area or forming notches. However, joining of the low-rigidity parts 32 and the center parts 31 is not limited to welding, and may be performed by other joining methods.

As shown in FIG. 1, the low-rigidity parts 32 of the cross members 30 are joined to the lower side-member parts 13 with collars 53 interposed therebetween by bolts 51. The bolts 51 are screwed into the nuts 52 welded on the bottom walls of the lower side-member parts 13, through the holes formed in the low-rigidity parts 32 and the collar 53 formed on the low-rigidity parts, whereby the low-rigidity parts 32 are fixed to the lower side-member parts 13.

The front-rear direction reinforcing members 40 are long members which have a hat-shaped cross-section and extend in the front-rear direction of the vehicle, and are joined on the center parts 31 of the plurality of cross members 30 so as to cross the center parts. In the present embodiment, the front-rear direction reinforcing members 40 are joined on the center parts 31 of the cross members 30 at the center in the width direction of the vehicle and at positions on both sides in the width direction of the vehicle, so as to cross the cross members at positions that are adjacent to the low-rigidity parts 32 of the cross members 30 and closer to the center in the width direction of the vehicle than are the low-rigidity parts 32 of the cross members 30. In this case, the low-rigidity parts 32 of the cross members 30 may be located further outward in the width direction of the vehicle than the outer surfaces of the battery pack 20 in the width direction of the vehicle, and the front-rear direction reinforcing members 40 on both sides in the width direction of the vehicle may cross the center parts 31 of the cross members 30 so as to be located further inward in the width direction of the vehicle than the outer surfaces of the battery pack 20 in the width direction of the vehicle.

As shown in FIG. 2, the pair of side members 14 are joined to a pair of front side members 16 which are disposed on both sides of the front side of the vehicle in the width direction of the vehicle and extend in the front-rear direction. The front side members 16 are frame members which are disposed on both sides of a front compartment 17 in the width direction of the vehicle and extend in the front-rear direction. The front compartment 17 is a front part of the vehicle which is separated from the inside of the vehicle by a dash panel 15 and is for storing a power unit and an engine. To the front ends of the front side members 16, crash boxes 18 are joined, and on the fronts of the crush boxes 18, a bumper reinforcement 19 is mounted so as to extend in the width direction of the vehicle. The bumper reinforcement 19 is a member to which an impact force is input in the case where the front of the vehicle collides with an obstacle, and the crash boxes 18 are members for absorbing the impact force.

Figure 3:
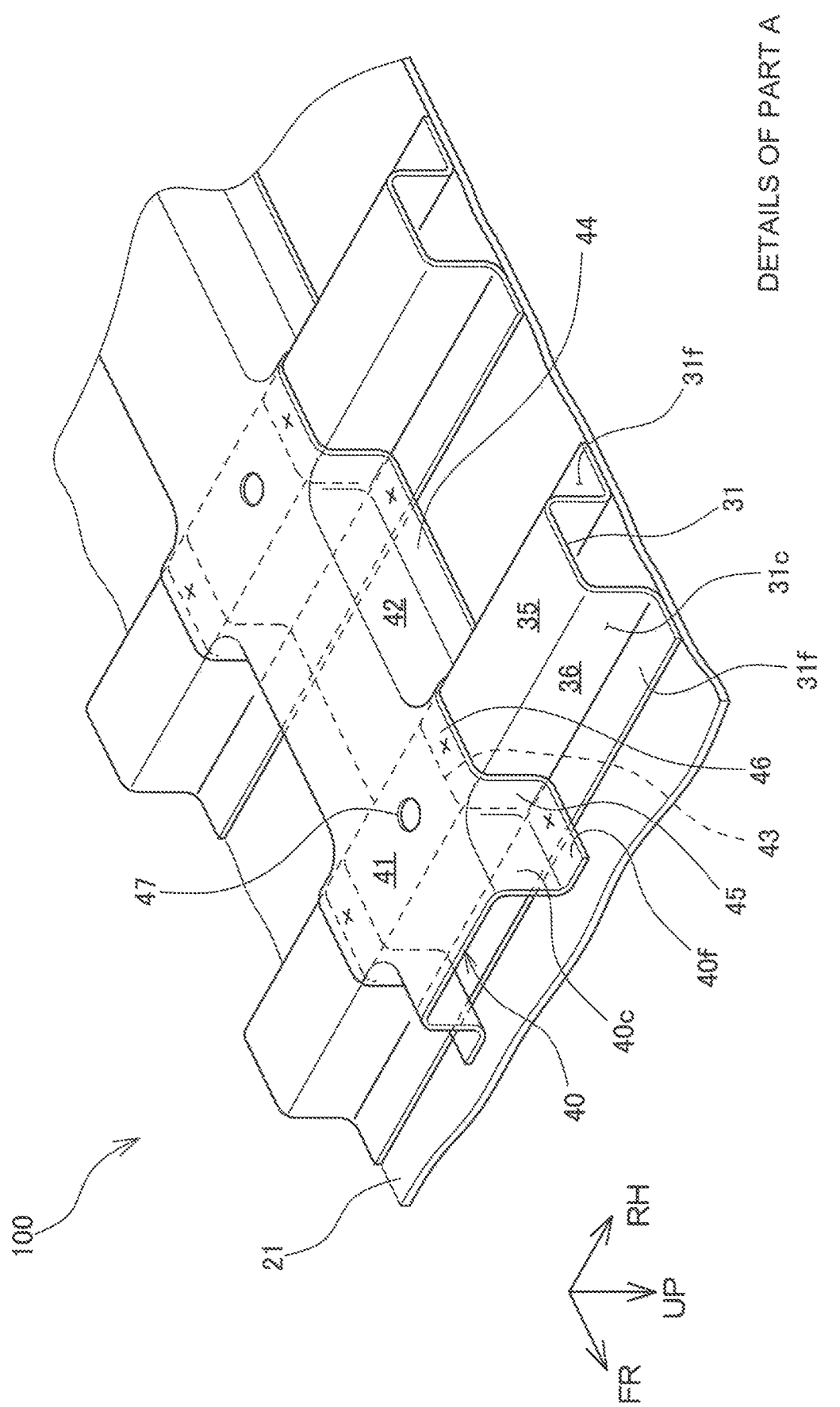
FIG. 3 is a perspective view illustrating Part A (a cross joint part of a cross member and a front-rear direction reinforcing member) of FIG. 2 in detail.

As shown in FIG. 3, the center parts 31 of the cross members 30 and the front-rear direction reinforcing members 40 are long members which have groove-shaped parts 31c and 40c and flanges 31f and 40f and have hat-shaped cross-sections. Each of the groove-shaped parts 31c of the center parts 31 is composed of a bottom plate 35, and upright plates 36 formed on both ends of the bottom plate 35 in the width direction. Also, similarly, each of the groove-shaped parts 40c of the front-rear direction reinforcing members 40 is composed of a bottom plate 41, and upright plates 42 formed on both ends of the bottom plate 41 in the width direction. The flanges 31f of the center parts 31 of the cross members 30 support the outer surface of the bottom of the casing 21 for the battery pack 20.

Figure 4:
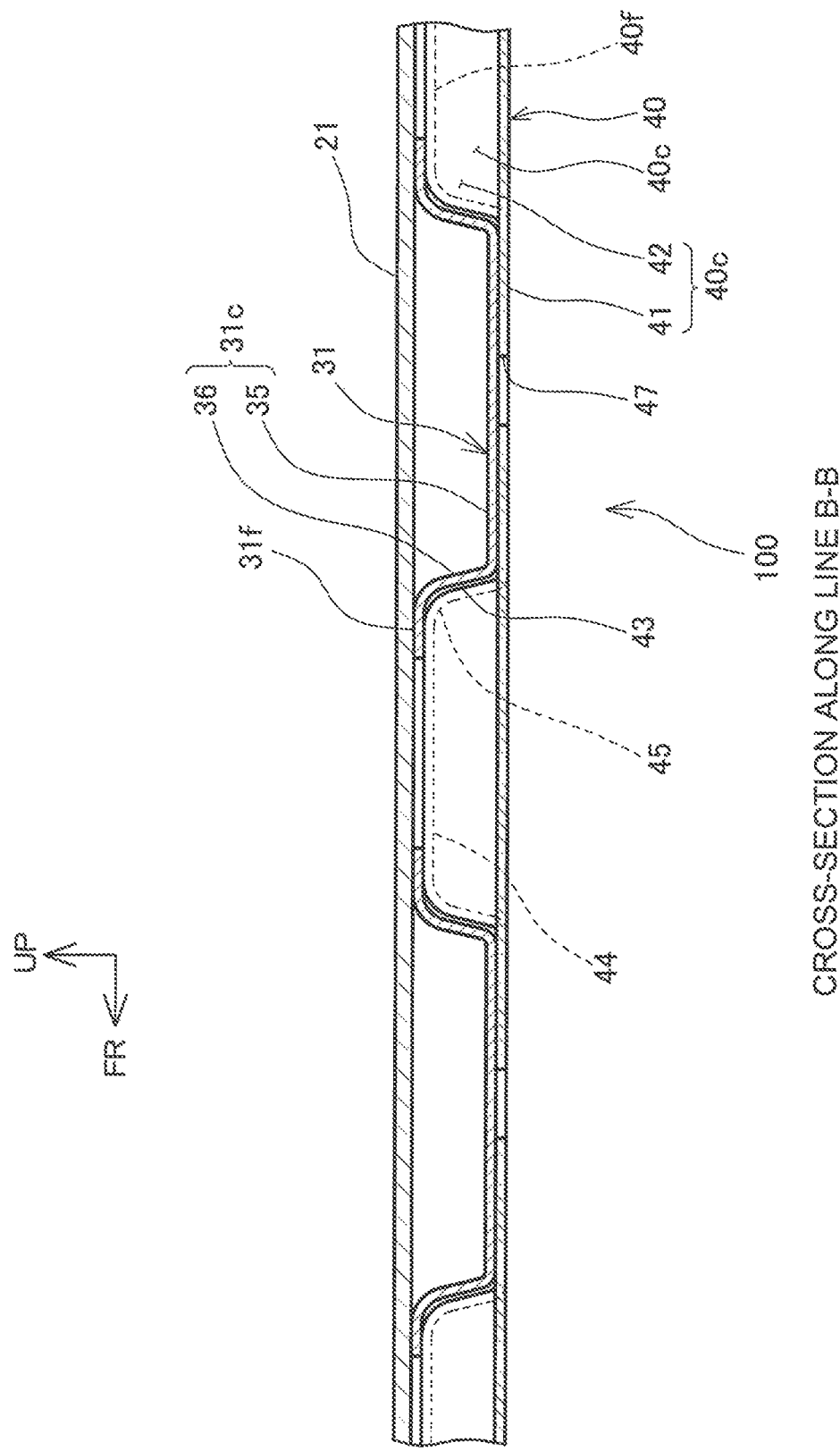
FIG. 4 is a cross-sectional view taken along a line B-B shown in FIG. 2 (a view illustrating the vertical cross-section of cross members and a front-rear direction reinforcing member at the center of the front-rear direction reinforcing member in the width direction, taken along the longitudinal direction)

As shown in FIGS. 3 and 4, parts of the upright plates 42 of the groove-shaped parts 40c of the front-rear direction reinforcing members 40 to intersect with the center parts 31 have U-shaped cutouts 43 formed along the convex shapes of the groove-shaped parts 31c of the center parts 31. Further, the bottom plates 41 of the groove-shaped parts 40c are disposed on and joined to the outer surfaces of the bottom plates 35 of the groove-shaped parts 31c of the center parts 31. The intersection parts of bottom plates 41 of the groove-shaped parts 40c have holes 47, and the circumferential edges of the holes 47 and the bottom plates 35 of the center parts 31 are fixed to each other by welding.

Further, as shown in FIGS. 3 and 5, the flanges 40f of the front-rear direction reinforcing members 40 extend horizontally in the front-rear direction between the upright plates 36 of neighboring center parts 31 facing each other, and are curved in U-shapes along the convex shapes of the groove-shaped parts 31c of the center parts 31 in the parts intersecting with the center parts 31. The parts which intersect with the center parts 31 are composed of upright parts 45 which extend in the vertical direction along the upright plates 36 of the groove-shaped parts 31c extending the front-rear direction of the vehicle, and lower parts 46 which extend in the front-rear direction of the vehicle along the bottom plates 35 of the groove-shaped parts 31c which are mounted under the vehicle. The surfaces of the lower parts 46 which are mounted under the vehicle are the same surfaces as the surfaces of the bottom plates 41 of the groove-shaped parts 40c which are mounted under the vehicle.

Normal parts 44 of the flanges 40f of the front-rear direction reinforcing members 40 are disposed on the flanges 31f of the center parts 31, and are welded at small points as shown by cross marks in FIG. 3. Further, the upright parts 45 are disposed on the upright plates 36 of the groove-shaped parts 31c, and the lower parts 46 are disposed on the bottom plates 35 of the groove-shaped parts 31c. As shown by cross marks in FIG. 3, the lower parts 46 are welded to the bottom plates 35 of the groove-shaped parts 31c at small points.

As described above, the bottom plates 35 of the groove-shaped parts 31c of neighboring center parts 31 are joined by the bottom plates 41 of the groove-shaped parts 40c of the front-rear direction reinforcing members 40. Further, the flanges 31f of neighboring center parts 31 are joined in the front-rear direction of the vehicle by the normal parts 44 of the flanges 40f of the front-rear direction reinforcing members 40. Furthermore, on the outer surfaces of the upright plates 36 and the bottom plates 35 of the groove-shaped parts 31c of the center parts 31, the upright parts 45 and the lower parts 46 of the flanges 40f of the front-rear direction reinforcing members 40 are disposed. As described above, the flanges 40f of the front-rear direction reinforcing members 40 are curved in the U-shapes along the convex shapes of the groove-shaped parts 31c of the center parts 31, and are disposed on the outer surfaces of the upright plates 36 and the bottom plates 35 of the groove-shaped parts 31c of the center parts 31. Therefore, the groove-shaped parts 31c of the center parts 31 are held in the front-rear direction of the vehicle and the vertical direction of the vehicle by the upright parts 45 and the lower parts 46.

<Functions and Effects of Vehicle Bottom Structure>

If the front of the vehicle equipped with the vehicle bottom structure 100 described above collides with an obstacle, the impact force is input to the bumper reinforcement 19 shown in FIG. 2. The impact force is input to the side members 14 via the front side members 16. Then, the impact force input to the side members 14 is transmitted to the cross member 30 disposed on the front side of the vehicle. The impact force input to the cross member 30 disposed on the front side of the vehicle is transmitted to the front-rear direction reinforcing members 40 joined on the plurality of cross members 30 so as to cross the cross members. Then, the front-rear direction reinforcing members 40 share the impact force input from the front side of the vehicle. Therefore, the cross members 30 retreat, whereby it is possible to suppress deformation and damage of the battery pack 20.

Also, since neighboring cross members 30 are joined by the front-rear direction reinforcing members 40, in the case where a pole collides with a part of the vehicle between the cross members 30 from one side, it is possible to suppress opening of the cross members 30 in the front-rear direction of the vehicle. Therefore, it is possible to suppress deformation and damage of the battery pack 20.

Also, in the vehicle bottom structure 100, since the bottom plates 41 of the groove-shaped parts 40c of the front-rear direction reinforcing members 40 are disposed on the outer surfaces of the bottom plates 35 of the center parts 31 of the cross members 30, and are joined thereto by welding, the joint strength of the front-rear direction reinforcing members 40 and the cross members 30 is high. Therefore, even when a large impact force is input in the front-rear direction of the vehicle from the front of the vehicle to the cross member 30 disposed on the front side of the vehicle via the side members 14, the impact force is distributed to the front-rear direction reinforcing members 40. Therefore, it is possible to suppress deformation and damage of the battery pack 20.

Further, in the vehicle bottom structure 100, the bottom plates 41 of the groove-shaped parts 40c of the front-rear direction reinforcing members 40 and the bottom plates 35 of the groove-shaped parts 31c of the center parts 31 of the cross members 30 are joined, and the normal parts 44 of the flanges 40f of the front-rear direction reinforcing members 40 are disposed on the flanges 31f of the center parts 31, and are joined thereto, and the groove-shaped parts 31c of the center parts 31 of the cross members 30 are held in the front-rear direction of the vehicle and the vertical direction of the vehicle by the parts of the flanges 40f of the front-rear direction reinforcing members 40 curved in the U-shapes, such that the cross members 30 and the front-rear direction reinforcing members 40 constitute one planar structure. Therefore, an impact force transmitted from the side members 14 to the cross member 30 disposed on the front side of the vehicle during a collision of the front of the vehicle is distributed to the plurality of front-rear direction reinforcing members 40 and the plurality of cross members 30. Therefore, deformation of the planar structure composed of the cross members 30 and the front-rear direction reinforcing members 40 is suppressed. Similarly, even in the case of a collision from one side, the impact force input from the side is distributed to the plurality of front-rear direction reinforcing members 40 and the plurality of cross members 30. Therefore, deformation of the planar structure composed of the cross members 30 and the front-rear direction reinforcing members 40 is suppressed. Therefore, it is possible to suppress deformation and damage of the battery pack 20 supported by the cross members 30.

Also, even in the case where the vehicle interferes with the road during running, whereby an impact force is input from the front of the vehicle to the cross members 30 or the front-rear direction reinforcing members 40, the impact force is distributed to the plurality of front-rear direction reinforcing members 40 and the plurality of cross members 30. Therefore, deformation of the planar structure composed of the cross members 30 and the front-rear direction reinforcing members 40 is suppressed. Therefore, even if interference with the road occurs, it is possible to suppress deformation and damage of the battery pack 20 supported by the cross members 30.

Also, the cross members 30 of the vehicle bottom structure 100 includes the low-rigidity parts 32 having rigidity lower than the rigidity of the center parts 31 on both end sides in the width direction of the vehicle, and the front-rear direction reinforcing members 40 are disposed so as to cross the center parts 31 at the positions that are adjacent to the low-rigidity parts 32 and closer to the center in the width direction of the vehicle than the low-rigidity parts 32. Therefore, during a collision from one side, the low-rigidity parts 32 absorb the energy of the collision, thereby reducing the impact, and the battery pack 20 is held in the planar structure composed of the center parts 31 having high rigidity and the front-rear direction reinforcing members 40. Therefore, during a collision from one side, it is possible to suppress deformation and damage of the battery pack 20.

However, the low-rigidity parts 32 may be located further outward in the width direction of the vehicle than the outer surfaces of the battery pack 20 in the width direction of the vehicle, and the front-rear direction reinforcing members 40 may be located further inward in the width direction of the vehicle than the outer surfaces of the battery pack 20 in the width direction of the vehicle. In this case, during a collision from one side, the areas between the side members 14 and the battery pack 20 can absorb the impact. Therefore, it is possible to suppress deformation and damage of the battery pack 20.

In the vehicle bottom structure 100 of the embodiment described above, there has been described the case where the bottom plates 41 of the groove-shaped parts 40c of the front-rear direction reinforcing members 40 are disposed on the outer surfaces of the bottom plates 35 of the center parts 31 of the cross members 30, and are joined thereto by welding. However, the present disclosure is not limited thereto. It also is possible to form concave parts at some parts of the bottom plates 41 of the groove-shaped parts 40c of the front-rear direction reinforcing members 40, and dispose the concave parts on the outer surfaces of the bottom plates 35, and it also is possible to dispose the bottom plates 41 of the front-rear direction reinforcing members 40 and the bottom plates 35 of the center parts 31 such that they overlap each other with spacers interposed therebetween, and join them by welding. Also, instead of welding, bolts, rivets, and so on may be used in joining.

Also, although the case where the three front-rear direction reinforcing members 40 are disposed at the center of the vehicle and on both sides in the width direction of the vehicle has been described, the number of front-rear direction reinforcing members 40 is not limited to three, and may be one or two, or may be four or more.

The invention claimed is:

1. A vehicle bottom structure for supporting a battery pack comprising:
   a pair of side members that are disposed on both sides of a vehicle in a width direction and extend in a front-rear direction of the vehicle;
   a plurality of cross members that extend in the width direction of the vehicle, are joined to the side members at both end parts, and support a bottom of the battery pack disposed under a floor panel between the side members, from below; and
   a front-rear direction reinforcing member that is joined under the cross members so as to extend in the front-rear direction of the vehicle and cross the cross members,
   wherein the cross member and the front-rear direction reinforcing member are each a long member having a hat-shaped cross-section and including: a groove-shaped part including a bottom plate and upright plates formed on both ends of the bottom plate in the width direction; and a flange connected to an open end of the groove-shaped part, and
   the front-rear direction reinforcing member has cutouts that are formed at positions of the upright plates to intersect with the cross member and formed in U-shapes along a convex shape of the groove-shaped part of the cross member, and the bottom plate of the groove-shaped part of the front-rear direction reinforcing member is disposed on and joined to the bottom plate of the groove-shaped part of the cross member.

2. The vehicle bottom structure according to claim 1, wherein the flange of the front-rear direction reinforcing member extends in the front-rear direction of the vehicle and is disposed on and joined to the flange of the cross member between the upright plates of neighboring cross members facing each other, and a part of the front-rear direction reinforcing member to intersect with the cross member is curved in a U-shape along the convex shape of the groove-shaped part of the cross member and disposed on the upright plates and the bottom plate of the groove-shaped part of the cross member.

3. The vehicle bottom structure according to claim 1, wherein
the cross member includes low-rigidity parts that are disposed on both end sides in the width direction of the vehicle and have rigidity lower than the rigidity of a center part, and
the front-rear direction reinforcing member is disposed so as to cross the cross member at a position that is adjacent to the low-rigidity part and closer to a center in the width direction of the vehicle than is the low-rigidity part.

4. The vehicle bottom structure according to claim 1, wherein
the cross member includes low-rigidity parts that are disposed on both end sides in the width direction of the vehicle and have rigidity lower than the rigidity of a center part, and
the front-rear direction reinforcing member is disposed so as to cross the cross member at a position that is adjacent to the low-rigidity part and closer to a center in the width direction of the vehicle than is the low-rigidity part.

5. The vehicle bottom structure according to claim 2, wherein
the cross member includes low-rigidity parts that are disposed on both end sides in the width direction of the vehicle and have rigidity lower than the rigidity of a center part, and the front-rear direction reinforcing member is disposed so as to cross the cross member at a position that is adjacent to the low-rigidity part and closer to a center in the width direction of the vehicle than the low-rigidity part.

6. The vehicle bottom structure according to claim 3, wherein
the low-rigidity parts of the cross member are located further outward in the width direction of the vehicle than outer surfaces of the battery pack in the width direction of the vehicle, and
the front-rear direction reinforcing member is located further inward in the width direction of the vehicle than the outer surfaces of the battery pack in the width direction of the vehicle.

7. The vehicle bottom structure according to claim 4, wherein
the low-rigidity parts of the cross member are located further outward in the width direction of the vehicle than outer surfaces of the battery pack in the width direction of the vehicle, and
the front-rear direction reinforcing member is located further inward in the width direction of the vehicle than the outer surfaces of the battery pack in the width direction of the vehicle.

8. The vehicle bottom structure according to claim 5, wherein
the low-rigidity parts of the cross member are located further outward in the width direction of the vehicle than outer surfaces of the battery pack in the width direction of the vehicle, and
the front-rear direction reinforcing member is located further inward in the width direction of the vehicle than the outer surfaces of the battery pack in the width direction of the vehicle.

\* \* \* \* \*